US008558671B2

(12) United States Patent
Shiotsu et al.

(10) Patent No.: US 8,558,671 B2
(45) Date of Patent: Oct. 15, 2013

(54) ACTIVE TAG APPARATUS, COMMUNICATION APPARATUS AND SYSTEM

(75) Inventors: Shinichi Shiotsu, Kawasaki (JP); Isamu Yamada, Kawasaki (JP); Satoshi Inano, Kawasaki (JP); Hideki Tanaka, Kawasaki (JP); Daisuke Yamashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 356 days.

(21) Appl. No.: 12/644,927

(22) Filed: Dec. 22, 2009

(65) Prior Publication Data

US 2010/0176930 A1 Jul. 15, 2010

(30) Foreign Application Priority Data

Jan. 15, 2009 (JP) .................................. 2009-007096

(51) Int. Cl.
*H04Q 5/22* (2006.01)

(52) U.S. Cl.
USPC ....................................................... 340/10.1

(58) Field of Classification Search
USPC .......... 340/10.1, 505, 12.51, 13.24; 455/41.2, 455/513
See application file for complete search history.

(56) References Cited

U.S. PATENT DOCUMENTS

| 5,457,816 | A * | 10/1995 | Koyama ...................... 455/161.2 |
| 6,317,027 | B1 * | 11/2001 | Watkins ........................ 340/10.1 |
| 7,026,935 | B2 * | 4/2006 | Diorio et al. ............... 340/572.2 |
| 7,446,662 | B1 * | 11/2008 | Somogyi et al. ........... 340/572.4 |
| 7,817,014 | B2 * | 10/2010 | Krishna et al. ............... 340/10.4 |
| 2003/0179731 | A1 | 9/2003 | Noguchi et al. |
| 2005/0052279 | A1 * | 3/2005 | Bridgelall ..................... 340/10.1 |
| 2005/0288015 | A1 | 12/2005 | Azizi et al. |
| 2006/0056367 | A1 | 3/2006 | Marinier et al. |
| 2006/0276206 | A1 | 12/2006 | Shiotsu et al. |
| 2009/0128141 | A1 | 5/2009 | Hopmann et al. |
| 2009/0129324 | A1 | 5/2009 | Soneda |
| 2009/0303016 | A1 | 12/2009 | Deuber et al. |

FOREIGN PATENT DOCUMENTS

| EP | 2007/128141 | 11/2007 |
| EP | 2007/138530 | 12/2007 |
| JP | 6-77888 | 3/1994 |
| JP | 2003-348007 | 12/2003 |
| JP | 2006-338489 | 12/2006 |
| JP | 2007-34866 | 2/2007 |
| WO | 2007/128141 | 11/2007 |
| WO | 2007-128141 | 11/2007 |
| WO | 2007-138530 | 12/2007 |
| WO | 2007/138530 | 12/2007 |

OTHER PUBLICATIONS

Bjorn Nilsson et al: "Protocols for Active RFID—The Energy Consumption Aspect" Industrial Embedded Systems, 2007. SIES' 07. International Sypos Ium on, IEEE, PI, Jul. 1, 2007, pp. 41-48, XP031131498, ISBN: 978-1-4244-0839-9. (8 pages).

(Continued)

*Primary Examiner* — Vernal Brown
(74) *Attorney, Agent, or Firm* — Staas & Halsey LLP

(57) ABSTRACT

A communication apparatus and an active tag apparatus that conduct radio communication with for data transmission and reception by radio with each other are provided. A frequency designation data including local transmission frequency used for data transmission and specifying data on a frequency of a carrier sense to be carried by the active tag apparatus is provided. A controller commands the active tag apparatus to use the frequency designation data for radio communication.

21 Claims, 12 Drawing Sheets

(56) References Cited

OTHER PUBLICATIONS

Extended European Search Report of Feb. 1, 2012 in corresponding EP Patent Application No. 09180444.3.
Björn Nilsson et al.: "Protocols for Active RFID—The Energy Consumption Aspect," Industrial Embedded Systems, 2007. SIES '07. International Symposium on, IEEE, PI, Jul. 1, 2007, pp. 41-48.

Japanese Office Action issued Jan. 8, 2013 in corresponding Japanese Patent Application No. 2009-007096.
Japanese Office Action mailed Apr. 9, 2013 for corresponding Japanese Application No. 2009-007096.
Japanese Office Action mailed Aug. 13, 2013 for corresponding Japanese Application No. 2009-007096.

* cited by examiner

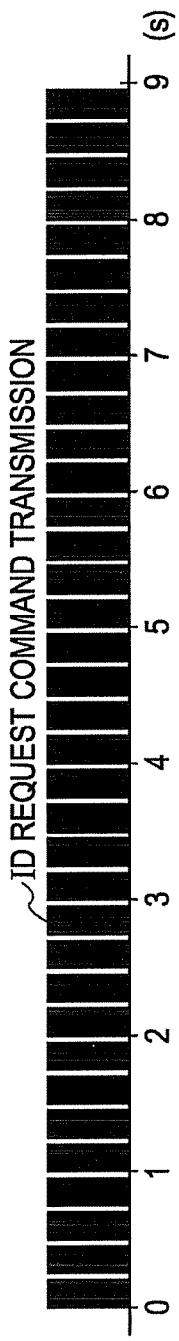
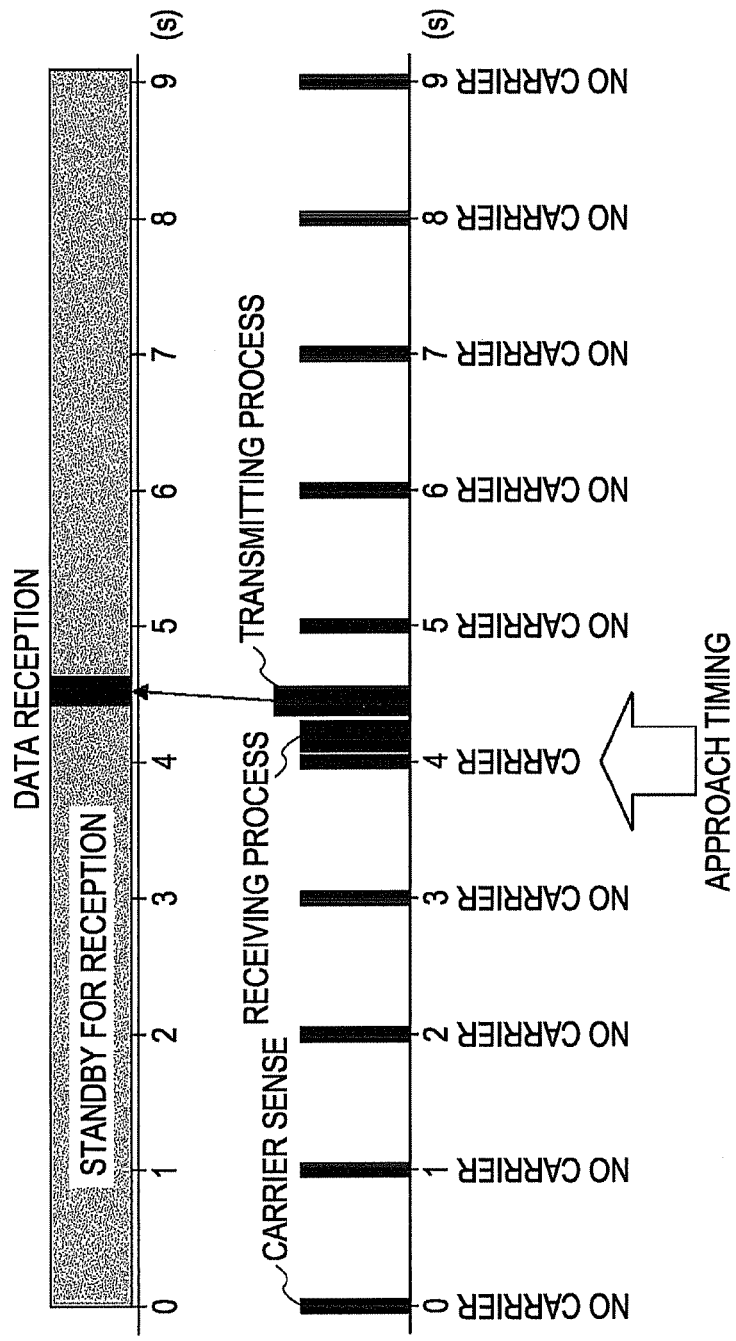
FIG. 1A READER-WRITER TRANSMITTING UNIT
FIG. 1B READER-WRITER RECEIVING UNIT
FIG. 1C TRANSMISSION AND RECEPTION BY ACTIVE TAG APPARATUS

FIG. 10

START
↓
EXECUTE CARRIER SENSE FOR ALL TRANSMISSION FREQUENCY CHANNELS OF READER-WRITER — S31
↓
STORE BY DETERMINING CARRIER SENSE DESIGNATION FREQUENCIES BASED ON DETECTED CARRIER FREQUENCY AND LOCAL CARRIER FREQUENCY — S33
↓
END

FIG. 11

| MAXIMUM RECEPTION STRENGTH FREQUENCY | CARRIER SENSE FREQUENCY |
|---|---|
| f1 | f1, f2, f3 |
| f2 | f1, f2, f3, f4 |
| f3 | f1, f2, f3, f4 |
| f4 | f2, f3, f4 |

ACTIVE TAG APPARATUS, COMMUNICATION APPARATUS AND SYSTEM

CROSS-REFERENCE TO RELATED APPLICATIONS

This application claims the benefit of priority from Japanese Patent Application No. 2009-7096 filed on Jan. 15, 2009, which is herein incorporated by reference in its entirety.

FIELD

This invention relates to a transceivable active tag apparatus, a communication apparatus for transmitting and receiving data to and from the active tag apparatus, and a system thereof.

BACKGROUND

The active tag apparatus is a kind of the radio IC tag (RF (radio frequency) ID), and an IC tag of such a type that the communication over the distance of about several tens of meters is possible using a built-in battery.

In the typical active tag apparatus, generally, the data is only transmitted to the reader-writer (i.e. the data read-write apparatus). In recent years, however, the active tag apparatus capable of both transmission and reception has become available (for example, see Japanese Unexamined Patent Publication No. 2006-338489).

Generally, the active tag apparatus is attached to a commodity or a person and wirelessly transmits the information such as the ID assigned to the commodity or the person, as the case may be, so that the reader that has read the radio wave acquires the ID, etc. from the active tag apparatus.

In this way, the distribution of a commodity or the behavior of a person can be monitored and managed without contact, and therefore, this apparatus is expected to find applications in various fields.

Also, as compared with the tag apparatus of passive type in which the drive power is supplied from the reader-writer without contact, the active tag apparatus, being driven by battery and having a comparatively long communicable distance, is higher in practicability.

The communication sequence between this transceivable active tag apparatus and the reader-writer is illustrated in FIGS. 1A to 1C.

FIG. 1A illustrates the process sequence of the transmission unit of the reader-writer, FIG. 1B the process sequence of the receiving unit of the reader-writer, and FIG. 1C the process sequence of transmission and reception of the active tag apparatus.

As illustrated in FIG. 1A, the transmission unit of the reader-writer continuously transmits an ID request command for requesting the tag ID to the active tag apparatus located in the neighborhood thereof.

The receiving unit of the reader-writer, on the other hand, as illustrated in FIG. 1B, is always in standby state for reception to catch (receive) the data from the active tag apparatus.

Further, as illustrated in FIG. 1C, the active tag apparatus confirms the existence of the reader-writer by carrying out the carrier sense at intervals of, for example, one second.

In the case where the reader-writer and the active tag apparatus approach each other at intervals of about four seconds and the radio wave from the reader-writer is detected by carrier sense, for example, the active tag apparatus carries out the data reception process and receives the ID request command, etc. from the reader-writer.

The reception process is executed for a time length of, for example, about 100 ms.

After that, the process to transmit the tag ID, etc. is executed in response to the ID request command.

The receiving unit of the reader-writer, on the other hand, executes the process of receiving the data transmitted from the active tag apparatus.

FIGS. 1A to 1C illustrate an example of the case in which one reader-writer exists. In the case where a plurality of reader-writers are arranged in proximity, however, the process sequence as illustrated in FIG. 2, example, is executed.

Specifically, in the case where three reader-writers A to C are arranged in proximity, for example, each reader-writer transmits the data at the same frequency, and therefore, the time division system is employed.

Specifically, a host computer is connected to each reader-writer, and in accordance with a command from the host computer, the repetitive transmission process is carried out by shifting the time of the transmission of the reader-writer A, the transmission of the reader-writer B and the transmission of the reader-writer C in that order.

In the case of FIG. 2, each reader-writer executes the transmission process two times per second.

SUMMARY

According to a first aspect of the invention, a communication apparatus having a radio communication unit for conducting radio communication with an active tag apparatus capable of data transmission and reception by radio, a data storage unit for storing the frequency designation data including the local transmission frequency used by the radio communication unit for data transmission and constituting the data on the frequency of the carrier sense to be carried out by the active tag apparatus, and a control unit for causing the frequency designation data stored in the data storage unit to be transmitted by the radio communication unit to the active tag apparatus at the local transmission frequency.

According to a second aspect of the invention, an active tag apparatus having a radio communication unit capable of carrying out the carrier sense at a plurality of frequencies and adapted to transmit and receive the data at a specified radio frequency to and from a communication apparatus, and a control unit which, upon detection that the data received from the communication apparatus by the radio communication unit contains the frequency designation data constituting the data on the frequency for the carrier sense to be carried out, designates to the radio communication unit, based on the frequency designation data, the frequency for the carrier sense to be carried out.

According to a third aspect of the invention, an active tag apparatus having a radio communication unit capable of carrying out the carrier sense at a plurality of frequencies and measuring the reception strength of the received radio wave to transmit and receive the data at a specified radio frequency to and from a communication apparatus, a data storage unit for storing, in correspondence with each other, the maximum reception strength frequency and the designated frequency constituting the frequency for the carrier sense to be carried out, and a control unit for causing the radio communication unit to carry out the carrier sense at a plurality of frequencies, receiving the result of measuring the reception strength for each of the plurality of the frequencies, specifying the frequency maximizing the reception strength from the measurement result, reading the designated frequency corresponding to the particular frequency from the data storage unit and causing the radio communication unit to carry out the carrier sense at the designated frequency.

BRIEF DESCRIPTION OF THE DRAWINGS

FIGS. 1A to 1C are diagrams illustrating the process sequence according to the related art.

FIG. 10 is a diagram illustrating the process flow of the reader-writer according to a second embodiment.

FIG. 11 is a diagram illustrating an example of the carrier sense frequency table.

DETAILED DESCRIPTION OF EMBODIMENT(S)

The related art fails to take into consideration any case in which each of a plurality of reader-writers transmits data at a different frequency.

Also, an active tag apparatus, which is driven by a battery, requires a battery change, and therefore, is required to reduce the power consumption thereof as far as possible.

In the system disclosed below, the power consumption of the active tag apparatus can be reduced even in the case where each of a plurality of reader-writers transmits data at a different frequency.

Embodiment 1

Figure 2:
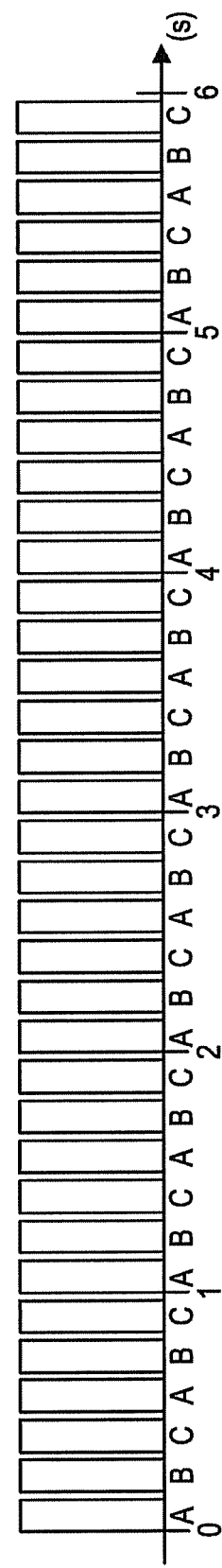
FIG. 2 is a diagram illustrating the process sequence according to the related art.
Figure 3:
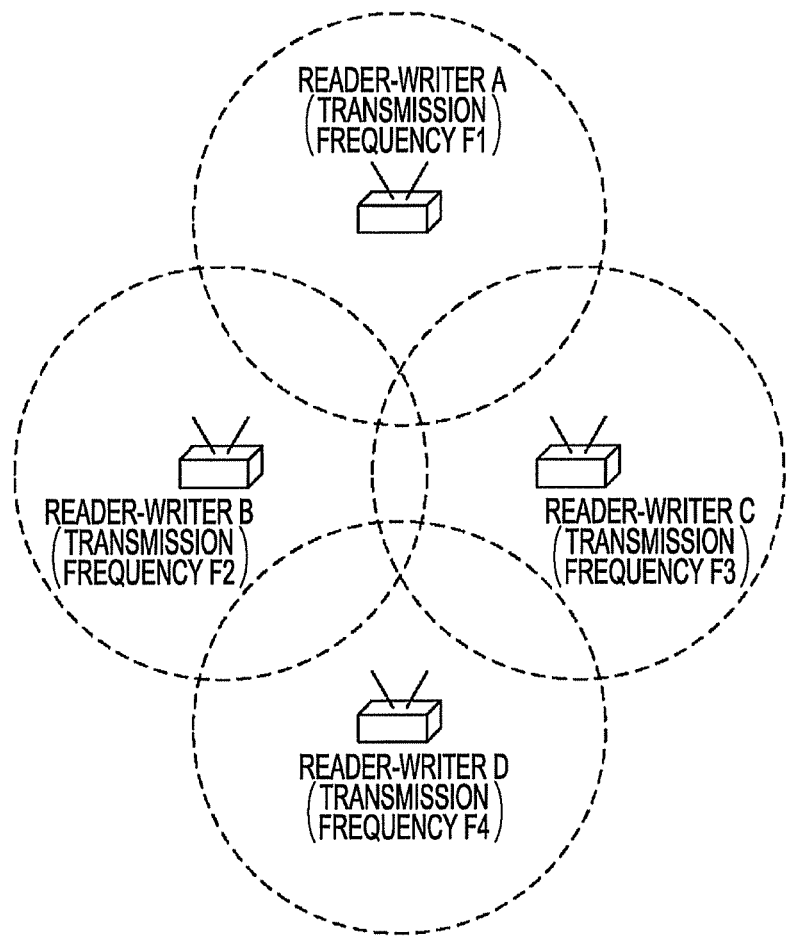
FIG. 3 is a diagram illustrating an example of the situation in which the reader-writer is installed.

According to this embodiment, as illustrated in FIG. 3, four reader-writers, for example, are arranged in proximity to each other and the area reached by the transmission radio wave of each reader-writer is assumed to be in the range defined by dotted circle (which is only an example and may not be a circle) with the particular reader-writer at the center.

Incidentally, the area reached is hereinafter referred to sometimes as the reader-writer area.

The installation state illustrated in FIG. 3 represents an example in which the reader-writers are arranged with the reader-writer areas in superposed relation to each other in order to prevent the leakage to the area for monitoring the active tag apparatus.

Each reader-writer uses a different frequency channel to prevent the radio wave interference.

According to this embodiment, assume that the reader-writer A, for example, has the transmission frequency f1, the reader-writer B the transmission frequency f2, the reader-writer C the transmission frequency f3, and the reader-writer D the transmission frequency f4.

The transmission frequencies available for the reader-writers, however, are f1 to f6, of which f5 and f6 is not used in the case of FIG. 3.

Figure 4:
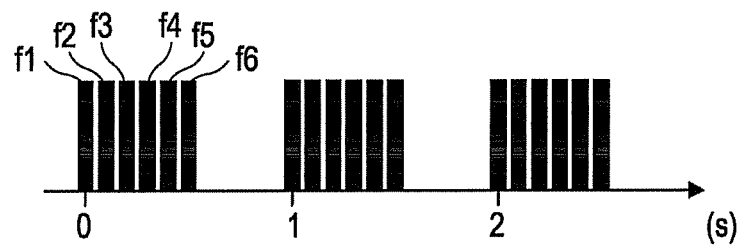
FIG. 4 is a diagram for explaining the normal carrier sense.

In this situation, the active tag apparatus not informed of the layout of the reader-writers and the actual operating frequency beforehand, in simplistic terms as illustrated in FIG. 4, can detect the RF signal from at least any one of the intended reader-writers by carrying out the carrier sense at the frequencies f1 to f6.

Incidentally, FIG. 4 illustrates an example of carrying out the carrier sense once per second. For example, the carrier sense is carried out for about 1 ms to 10 ms at the frequencies f1 to f6 in that order during the period of one second.

In the case where the carrier sense is carried out at as many frequencies as in this example, the time for which the carrier sense is carried out is lengthened, and therefore, the power consumption of the active tag apparatus is increased.

As a result, the battery is frequently consumed up and considerable labor is required to change the battery.

Figure 5:
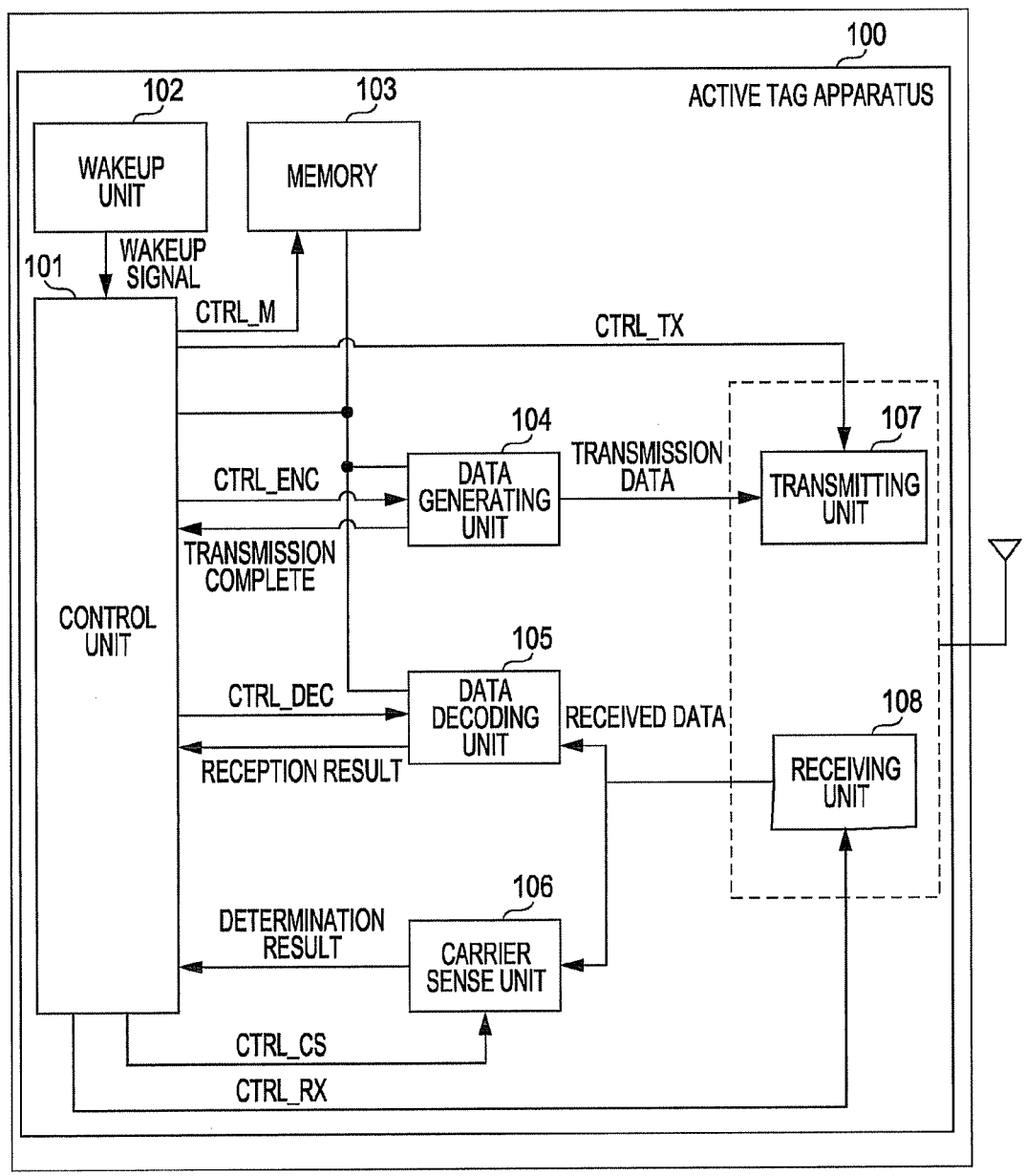
FIG. 5 is a function block diagram of the active tag apparatus.
Figure 6:
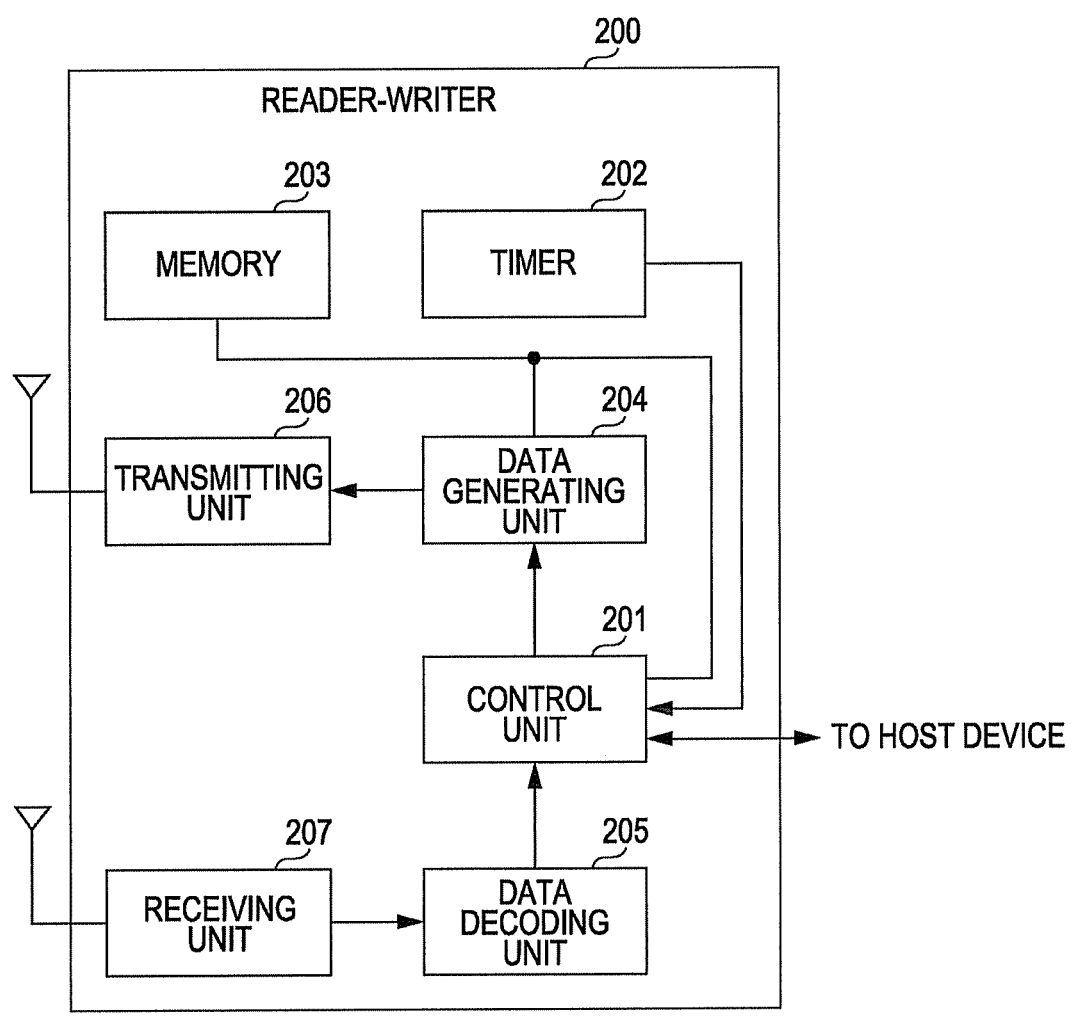
FIG. 6 is a function block diagram of the reader-writer.

In view of this, according to the present embodiment, the configuration of the active tag apparatus illustrated in FIG. 5 and the reader-writer illustrated in FIG. 6 are employed to reduce the power consumption by reducing the number of frequencies for carrier sense as far as possible.

FIG. 5 illustrates a function block diagram of the active tag apparatus 100 according to this embodiment.

The active tag apparatus 100 includes a control unit 101, a wakeup unit 102, a memory 103, a data generating unit 104, a data decoding unit 105, a carrier sense unit 106, a transmission unit 107 and a receiving unit 108.

The control unit 101 is connected to the wakeup unit 102, the memory 103, the data generating unit 104, the data decoding unit 105, the carrier sense unit 106, the transmission unit 107 and the receiving unit 108. The control unit 101 outputs a control signal CTRL_M to the memory 103, a control signal CTRL_TX to the transmission unit 107, a control signal CTRL_RX to the receiving unit 108, a control signal CTRL_ENC to the data generating unit 104, a control signal CTRL_DEC to the data decoding unit 105, and a control signal CTRL_CS to the carrier sense unit 106.

The control unit 101, in addition to the start and the end of the operation, causes each component element of the active tag apparatus to perform the operations described below by means of a control signal.

The wakeup unit 102 includes, for example, a timer for measuring the interval (1 second, for example) at which the carrier sense is carried out, and outputs a wakeup signal at the same intervals as the carrier sense is carried out.

The memory 103 stores, for example, the tag ID of the active tag apparatus, the designated frequency data for carrier sense explained below, and the data received from the reader-writers.

The memory 103 is connected to the control unit 101, the data generating unit 104 and the data decoding unit 105. The control unit 101, the data generating unit 104 and the data decoding unit 105 in turn are adapted to read and write the data from and into the memory 103.

The data generating unit 104 is connected to the memory 103, the transmission unit 107 and the control unit 101, while the data decoding unit 105 is connected to the memory 103, the receiving unit 108 and the control unit 101.

The carrier sense unit 106 is connected to the receiving unit 108 and the control unit 101.

In the data generating unit 104, the data such as the tag ID stored in the memory 103 is coded in accordance with a given coding scheme thereby to generate the coded data, which is output to the transmission unit 107.

The transmission unit 107 modulates the carrier with the coded data of the base band received from the data generating unit 104, and transmits the RF (radio frequency) signal of the transmission frequency from an antenna.

Upon complete data transmission, the data generating unit 104 outputs the transmission end signal to the control unit 101.

The receiving unit 108 receives the reception RF signal through an antenna and by further demodulating it, generates a baseband coded data, which is output to the data decoding unit 105.

The receiving unit 108 also generates the data indicating the reception strength of the received RF signal and outputs it to the carrier sense unit 106.

In the data decoding unit 105, the coded data received from the receiving unit 108 is decoded in accordance with a given coding scheme to generate the decoded data, which is stored in the memory 103 or output to the control unit 101.

The carrier sense unit 106 receives the data indicating the reception strength of the carrier from the receiving unit 108, and based on this data, judging the presence or absence of the carrier of the received RF signal, outputs the judgment result to the control unit 101.

Incidentally, the receiving unit 108 and the transmission unit 107 are included in the radio communication unit which is connected to the antenna.

The control unit 101 may be either a dedicated semiconductor device or a combination of a processor and a program for realizing the function described below.

FIG. 6 is a function block diagram of the reader-writer 200 according to this embodiment.

The reader-writer 200 includes a control unit 201, a timer 202, a memory 203, a data generating unit 204, a data decoding unit 205, a transmission unit 206 and a receiving unit 207.

Incidentally, the reader-writer 200 is connected to a host device by wire or radio.

The control unit 201 is connected to the data generating unit 204, the data decoding unit 205, the memory 203 and the timer 202.

Incidentally, the control unit 201 may be connected also to the transmission unit 206 and the receiving unit 207 to output a command from the control unit 201 directly to the transmission unit 206 and the receiving unit 207.

The data generating unit 204 is connected to the transmission unit 206 and the memory 203, while the data decoding unit 205 is connected to the receiving unit 207.

The transmission unit 206 and the receiving unit 207 are each connected to an antenna.

A signal notifying the data transmission timing is output from the timer 202 to the control unit 201.

The control unit 201 causes the data to be transmitted in accordance with the signal from the timer 202.

Incidentally, according to this embodiment, the data are transmitted continuously at intervals of about 100 ms, for example, and the timer 202 measures the particular intervals.

The memory 203, as described below, stores the data indicative of the designated frequency transmitted to the active tag apparatus 100 and the data received from the host device and the active tag apparatus 100.

The control unit 201, upon reception of a command in the form of a signal from the timer 202, gives a command to the data generating unit 204 to transmit the data.

The data to be transmitted to the active tag apparatus is read from the memory 203, etc. and output to the data generating unit 204 by the control unit 201, or a command is given to the data generating unit 204 to read the particular data from the memory 203.

The data generating unit 204, in accordance with the command from the control unit 201, generates the data in a given format including the data to be transmitted, which data is coded in accordance with a given coding scheme to generate the coded data which is output to the transmission unit 206.

In the transmission unit 206, the carrier is modulated by the baseband coded data received from the data generating unit 204 thereby to transmit the RF signal of the transmission frequency.

The receiving unit 207 receives the RF signal of the reception frequency and outputs the received data to the received data decoding unit 205.

In the received data decoding unit 205, the data received from the receiving unit 207 is decoded in accordance with a given coding scheme thereby to generate the baseband coded data, with the result that the decoded data thus generated is supplied to the control unit 201.

Figure 7:
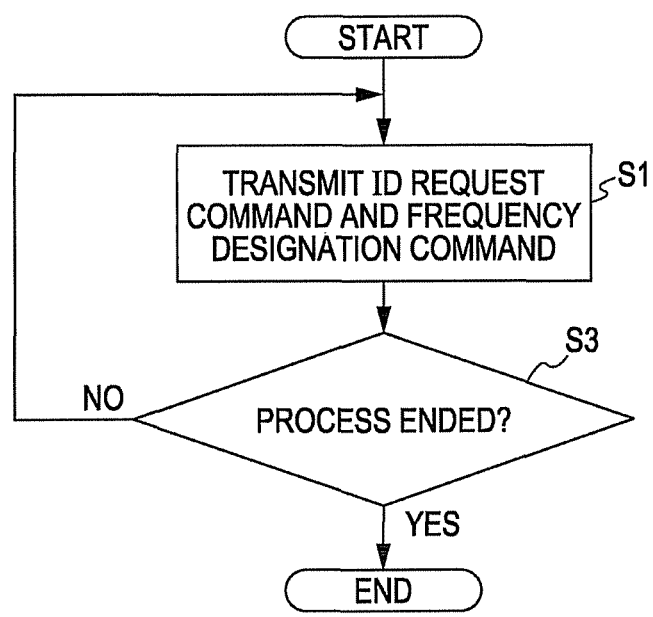
FIG. 7 is a diagram illustrating the process flow of the reader-writer according to a first embodiment.

Next, the process flow of the reader-writer 200 illustrated in FIG. 6 is explained with reference to FIG. 7.

The control unit 201 for the reader-writer 200, in accordance with the signal from the timer 202, instructs the data generating unit 204 to transmit the ID request command and the frequency designation command (Operation S1).

The frequency designation command, which is introduced in this embodiment, includes the data on one or more frequencies for which the carrier sense by an active tag apparatus is to be carried out in the case where the reception strength (RSSI: Received Signal Strength Indicator) of the radio wave from the reader-writer 200 is strongest.

With regard to the frequency data, assume that the use of six frequencies, for example, is considered. In such a case, an on-off command may be given for each six bits, the designated frequency itself may be included as a numerical value, or the ID of the designated frequency may be included.

As far as the reader-writers are installed as illustrated in FIG. 3, the reader-writer A transmits a frequency designation command including the local transmission frequency f1 and further including the transmission frequencies f2 and f3 of the reader-writers B and C installed adjacently.

The reader-writer B transmits a frequency designation command including the local transmission frequency f2 and further including the transmission frequencies f1, f3 and f4 of the reader-writers A, C and D installed adjacently.

Similarly, the reader-writer C transmits a frequency designation command including the local transmission frequency f3 and further including the transmission frequencies f1, f2 and f4 of the reader-writers A, B and D installed adjacently.

The reader-writer D transmits a frequency designation command including the local transmission frequency f4 and further including the transmission frequencies f2 and f3 of the reader-writers B and C installed adjacently.

Incidentally, the data on these frequencies are set by the manager in each reader-writer 200 and stored in the memory 203 in advance.

As an alternative, the data on the designated frequency received from the host device is stored in the memory 203 by the control unit 201.

The data generating unit 204 acquires the data on the designated frequency from the control unit 201 or the memory 203, and by generating the data in a given format including the frequency designation command with the ID request command and the particular data on the designated frequency, encodes the data in accordance with a given coding scheme thereby to generate the coded data, which is output to the transmission unit 206.

In the transmission unit 206, the carrier is modulated by the baseband coded data received from the data generating unit 204 and the RF signal of the transmission frequency is transmitted.

After that, the process returns to Operation S1 unless judged that the process is to be ended for some reason (NO in Operation S3).

Upon judgment that the process is to be ended for some reason, on the other hand, the process is ended (YES in Operation S3).

Figure 8:
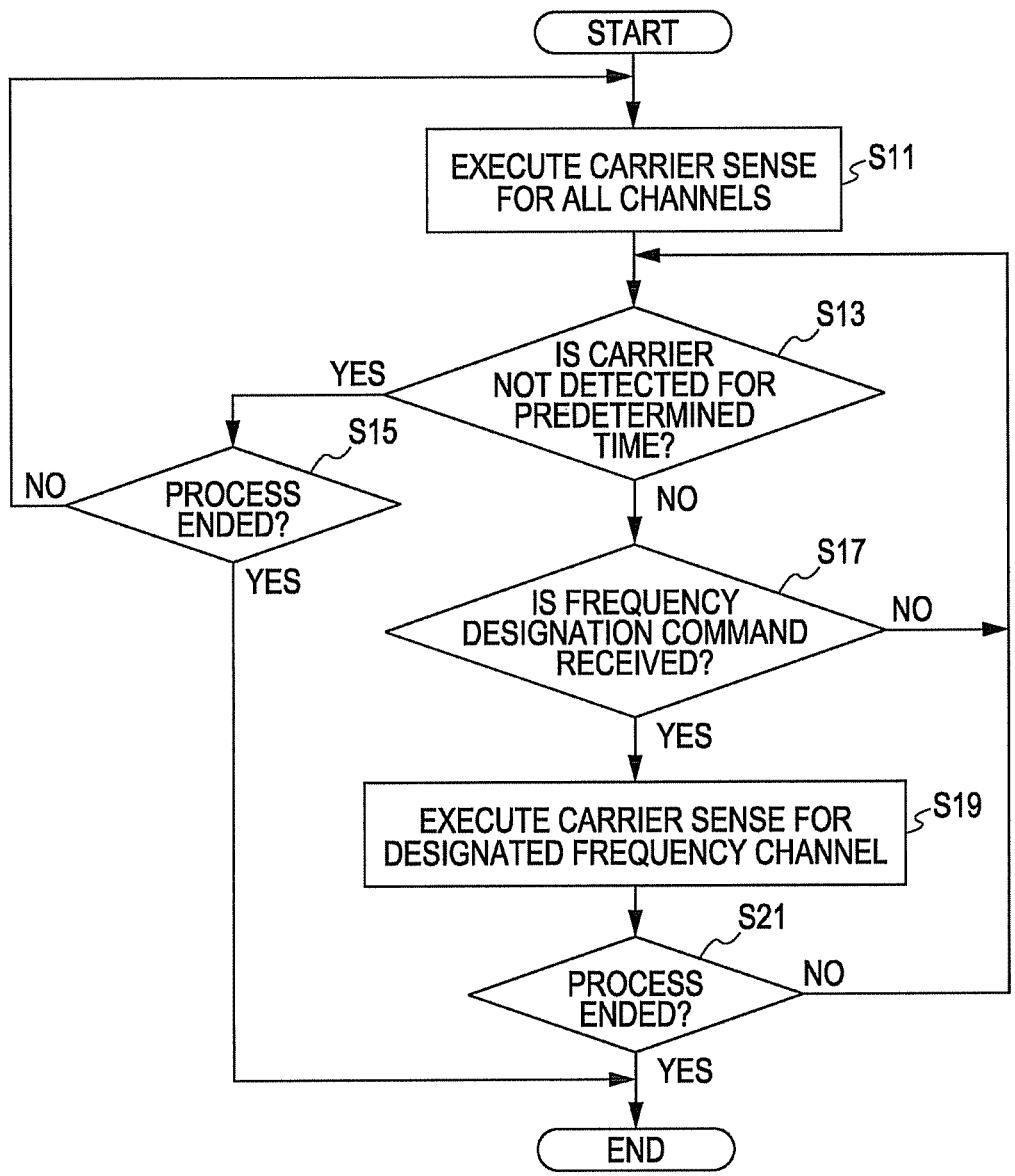
FIG. 8 is a diagram illustrating the process flow of the active tag apparatus according to the first embodiment.

In the meantime, the active tag apparatus 100 carries out the process as illustrated in FIG. 8.

The active tag apparatus 100, in accordance with the wakeup signal from the wakeup unit 102, activates the receiving unit 108 with the control signal CTRL_RX and the carrier sense unit 106 with the control signal CTRL_CS. Then, the carrier sense is carried out for all the frequency channels involved (the frequencies f1 to f6 in the aforementioned example) (Operation S11).

As illustrated in FIG. 4, the carrier sense is carried out for the frequencies f1 to f6, for example, in that order.

The carrier sense unit 106 receives the data indicating the carrier reception strength from the receiving unit 108, and based on this data, judges the presence or absence of the carrier of the received RF signal for each frequency, outputs the judgment result to the control unit 101.

Then, the control unit 101 judges whether all the carriers are not yet detected for a given time, based on the judgment result from the carrier sense unit 106 (Operation S13).

Upon judgment that all the carriers are not detected for a given time while not judging that the process is to be ended for some reason, then the process returns to Operation S11 (NO in Operation S15).

Upon judgment that the process is to be ended for some reason, on the other hand, the process is ended (YES in Operation S15).

The control unit 101, upon judgment that a carrier is detected for any frequency based on the judgment result from the carrier sense unit 106, on the other hand, outputs the control signal CTRL_DEC and causes the data decoding unit 105 to generate the decoded data for the received data of a frequency having the highest reception strength. Then, the control unit 101 receives the decoded data from the data decoding unit 105 and judges whether the particular decoded data contains a frequency designation command or not (Operation S17).

In the case where the frequency designation command is not contained, i.e. the frequency designation command is not received, then the data is regarded to have been received from the normal reader-writer other than the reader-writer according to this embodiment, for example, and the carrier sense continues to be carried out for all the frequency channels as in the normal case.

In other words, the process returns to Operation S13.

In the case where the frequency designation command is received, on the other hand, the data on the designated frequency contained in the frequency designation command, for example, is stored in the memory 103 by the control unit 101.

In the case where the frequency designation command is received from the reader-writer B in FIG. 3, for example, the designated frequencies include f1 to f4, and therefore, the data indicating the designated frequencies f1 to f4 is stored in the memory 103.

Next, the control unit 101, upon reception of the wakeup signal from the wakeup unit 102 and based on the data on the designated frequency stored in the memory 103, outputs the control signals CTRL_RX and CTRL_CS to the receiving unit 108 and the carrier sense unit 106, and instructs the receiving unit 108 and the carrier sense unit 106 to carry out the carrier sense with the designated frequency channel (Operation S19).

Upon judgment that the process is not to be ended for some reason, the process returns to Operation S13 (NO in Operation S21).

Upon judgment that the process is to be ended for some reason, on the other hand, the process is ended (YES in Operation S21).

Incidentally, after Operation S19, as described above, the carrier sense unit 106 judges the presence or absence of the carrier of the received RF signal for each frequency based on the data indicating the strength of the carrier from the receiving unit 108, and outputs the judgment result to the control unit 101.

The control unit 101, upon judgment that the carrier is detected for any frequency based on the judgment result from the carrier sense unit 106, outputs the control signal CTRL_DEC, and causes the data decoding unit 105 to generate the decoded data for the received data of the frequency highest in reception strength, which decoded data is stored in, for example, the memory 103.

Figure 9:
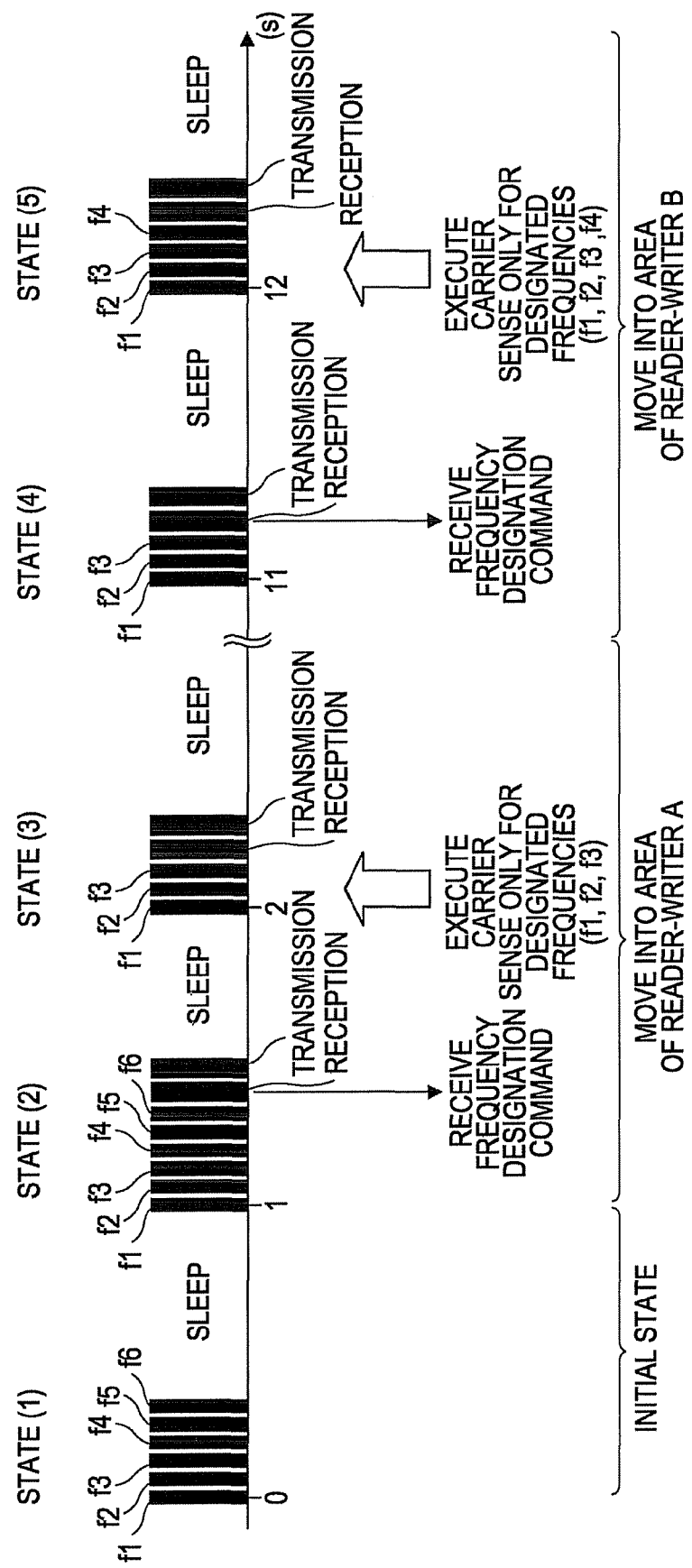
FIG. 9 is a diagram illustrating the process sequence according to the first embodiment.

Once the process described above is executed, the active tag apparatus 100 can carry out the process sequence as illustrated in FIG. 9.

FIG. 9, in which the time elapses from left to right, illustrates an example of starting to carry out the carrier sense at intervals of one second.

Also, FIG. 9 illustrates an example of movement from the area of the reader-writer A to the area of the reader-writer area B in the reader-writer arrangement illustrated in FIG. 3.

First, in the initial state (state (1)), the carrier sense is carried out for all the frequency channels, and unless the radio wave is received from any reader-writer, the sleep mode is entered.

In the case illustrated in FIG. 9, the active tag apparatus 100 sleeps after carrying out the carrier sense at the frequency f6 in the initial state.

With the movement of the active tag apparatus 100 to the area of the reader-writer A (state (2)), the carrier sense is first carried out for all the frequency channels in the same manner as in the initial state.

The radio signal is transmitted by the reader-writer A using the transmission frequency f1. Therefore, the active tag apparatus 100 detects the carrier at the frequency f1, and receiving the data, further transmits the tag ID, etc.

The frequency designation command, if contained in the received data, is followed.

The example illustrated in FIG. 9 indicates that the frequency designation command is contained in the data received in state (2).

As described above, the frequency designation command received from the reader-writer A indicates the designated frequencies f1 to f3.

Specifically, in the example illustrated in FIG. 9, the reader-writer A transmits the frequency designation command containing the local transmission frequency f1 and the transmission frequencies f2 and f3 of the reader-writers B and C installed adjacently.

Incidentally, the example of the content of the frequency designation command received from the reader-writer A in state 2 is an example conforming to the arrangement illustrated in FIG. 3.

In the case where the arrangement of the reader-writers is different, the content of the frequency designation command transmitted from the reader-writer A may be appropriately changed in correspondence with the difference.

In state (3) for carrying out the next carrier sense following the carrier sense carried out in state (2), the active tag apparatus 100, in accordance with the designated frequencies f1 to f3, carries out the carrier sense for the frequency channels of these designated frequencies f1 to f3 indicated by the frequency designation command received in state (2).

In state (3), the active tag apparatus 100 is located in the area of the reader-writer A, and therefore, receives the radio wave from the reader-writer A and executes the reception and transmission process for the reader-writer A.

After that, state (3) is sustained unless the active tag apparatus 100 leaves the area of the reader-writer A or the radio wave having the highest reception strength in the particular area undergoes a change.

In the case where the active tag apparatus 100 moves to the area of the reader-writer B sooner or later, the carrier sense is carried out at the same designated frequencies f1 to f3 as before in the initial state (state (4)). In view of the fact that the frequency of the radio wave highest in reception strength changes from f1 to f2, however, the data is received at the frequency f2.

Incidentally, the tag ID, etc. is transmitted in the same manner as in the normal case.

The frequency designation command from the reader-writer B, if contained in the received data, is followed.

In the example illustrated in FIG. 9, the frequency designation command is contained in the data received from the reader-writer B in state (4).

As described above, the frequency designation command received from the reader-writer B represents the designated frequencies f1 to f4.

In state (5), i.e. the state for carrying out the carrier sense following the carrier sense carried out in state (4), the active tag apparatus 100 carries out, in accordance with the designated frequencies f1 to f4, the carrier sense for the frequency channels of the designated frequencies f1 to f4 indicated by the frequency designation command received in state (4).

In state (5), the active tag apparatus 100 is located within the area of the reader-writer B, and therefore, receives the radio wave of the reader-writer B and carries out the process of receiving and transmitting the radio wave to and from the reader-writer B.

After that, the active tag apparatus 100 continues the operation illustrated in state (5) at given time intervals as long as the radio wave received from the reader-writer B remains higher in reception strength than the radio waves received from other reader-writers.

The difference in the power consumption amount is calculated below, for example, between a first case in which the carrier sense is carried out for six frequencies as in the initial state while at the same time executing the transmission and reception process in one cycle (the time interval for carrying out a carrier sense combined with the subsequent sleep, or one second in the example described above) and a second case in which the carrier sense is carried out for three frequencies in the area of the reader-writer A while at the same time executing the transmission and reception process.

Assume that the carrier sense time per frequency is 10 ms, the carrier sense power consumption 30 mW/s, the reception time and the transmission time each 10 ms, the transmission power and the reception power each 30 mW/s, and the power consumption for sleep 10 µW/s.

Then, the power consumption amount for the first case is given as about 2409.2 µW (=10 ms×30 mW/s×6+10 ms'30 mW/s+10 ms×30 mW/s+920 ms×10 µW/s), and the power consumption amount for the second case about 1509.5 µW (=10 ms×30 mW/s×3+10 ms×30 mW/s+10 ms×30 mW/s+ 950 ms×10 µW/s).

In other words, the power consumption can be reduced by about 37%.

Embodiments 2

According to the first embodiment, the data on the designated frequency are set beforehand in the reader-writer 200.

This setting work is conducted by the manager, etc., for example, who is well informed of the installation situation of the reader-writers 200.

In the case where a great number of reader-writers 200 are involved, however, considerable labor is required to conduct the setting work for all the reader-writers 200.

In the second embodiment, therefore, a method is explained in which the data on the designated frequency is set automatically.

FIG. 10 illustrates the process flow of the reader-writer 200.

This process flow is executed, for example, in the case where the reader-writer 200 is arranged at the installation place or at given time intervals.

Also, the process flow may be executed at an arbitrary timing requested by the host device, etc.

The control unit 201 of a reader-writer causes the receiving unit 207 to carry out the carrier sense for all the transmission frequency channels likely to be used by all other reader-writers and by itself (Operation S31).

The control unit 201 receives the data on the detection carrier frequency from the receiving unit 207, determines the designated frequency for carrier sense based on the particular detected carrier frequency and the local carrier frequency (itself), and stores the data on the designated frequency in the memory 203 (Operation S33).

By doing so, as in the first embodiment, the next frequency designation command can be transmitted as a frequency designation command containing the data on the designated frequency stored in the memory 203.

Embodiment 3

According to the first and second embodiments, the reader-writer 200 prepares the data on the designated frequency and transmits the frequency designation command containing the data on the designated frequency.

The third embodiment represents a method in which the special function or data is not prepared by the reader-writer 200, but the power consumption is reduced by reducing the number of the frequency channels for which the carrier sense is to be carried out.

The active tag apparatus 100 according to this embodiment is basically identical with the one illustrated in FIG. 5, except that the memory 103 holds a carrier sense frequency table as illustrated in FIG. 11.

The example illustrated in FIG. 11 indicates the data corresponding to the situation of FIG. 3.

Specifically, in the area of the reader-writer A, the reader-writer A transmits the radio signal using the transmission frequency f1, and therefore, the frequency of maximum reception strength is f1. Also, in view of the fact that the areas of the reader-writer B and the reader-writer C are adjacent to the area of the reader-writer A, the frequency channels for the carrier sense to be carried out are f1 to f3.

Also, in the area of the reader-writer B, the reader-writer B transmits the radio signal using the transmission frequency f2, and therefore, the frequency of maximum reception strength is f2. Also, in view of the fact that the areas of the reader-writer A, the reader-writer C and the reader-writer D are adjacent to the area of the reader-writer B, the frequency channels for the carrier sense to be carried out are f1 to f4.

Further, in the area of the reader-writer C, the reader-writer C transmits the radio signal using the transmission frequency f3, and therefore, the frequency of maximum reception strength is f3. Also, in view of the fact that the areas of the reader-writer A, the reader-writer B and the reader-writer D are adjacent to the area of the reader-writer C, the frequency channels for the carrier sense to be carried out are f1 to f4.

Furthermore, in the area of the reader-writer D, the reader-writer D transmits the radio signal using the transmission frequency f4, and therefore, the frequency of maximum reception strength is f4. Also, in view of the fact that the areas of the reader-writer B and the reader-writer C are adjacent to the area of the reader-writer D, the frequency channels for the carrier sense to be carried out are f2 to f4.

As described above, the frequency channel for the carrier sense to be carried out can be specified using the frequency of the maximum reception strength as a key.

Also as described above, the frequency used in this case may be either the frequency itself or the frequency ID.

This carrier sense frequency table is prepared in advance by the manager, etc. in accordance with the installation situation of the reader-writers 200.

Further, as described with reference to the process flow below, the memory 103 holds the data on the frequency of the maximum reception strength previously measured.

Figure 12:
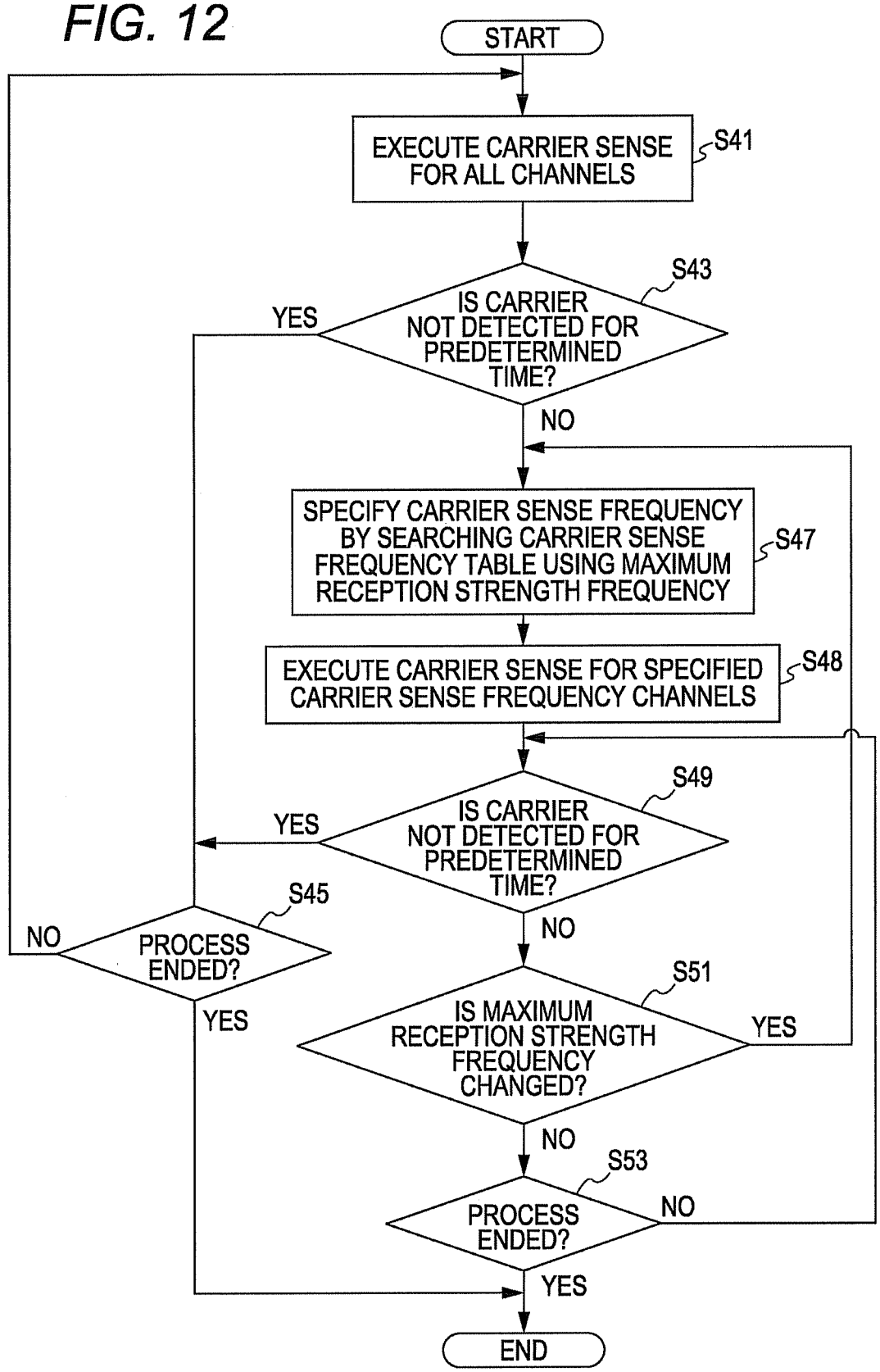
FIG. 12 is a diagram illustrating the process flow of the active tag apparatus according to a third embodiment.

Next, the content of the process executed by the active tag apparatus 100 according to this embodiment is explained with reference to FIG. 12.

The active tag apparatus 100 activates the receiving unit 108 with the control signal CTRL_RX in accordance with the wakeup signal from the wakeup unit 102, and causes the carrier sense unit 106 by activating it with the control signal CTRL_CS to carry out the carrier sense for all the frequency channels involved (the frequencies f1 to f6 in the aforementioned case) (Operation S41).

As illustrated in FIG. 4, the carrier sense is carried out for the frequencies f1 to f6, for example, in that order.

The carrier sense unit 106, based on the data indicating the carrier reception strength from the receiving unit 108, judges the presence or absence of the carrier of the received RF signal for each frequency, and outputs the judgment result to the control unit 101.

The judgment result is assumed to contain also the measurement result of the reception strength.

Then, the control unit 101 judges whether all the carriers are not detected or not for a given time, based on the judgment result from the carrier sense unit 106 (Operation S43).

Upon judgment that all the carriers are not detected for a given time and that the process is not ended for some reason, then the process returns to Operation S41 (NO in Operation S45).

Upon judgment that the process is to be ended for some reason, on the other hand, the process is ended (YES in Operation S45).

The control unit 101, upon judgment that the carrier is detected for any frequency based on the judgment result from the carrier sense unit 106, specifies the frequency of the maximum reception strength based on the reception strength data contained in the judgment result.

Then, the carrier sense frequency table of the memory 103 is searched with the frequency of the maximum reception strength thereby to specify the carrier sense frequency (Operation S47).

The frequency of the maximum reception strength for the current session is stored in the memory 103.

Incidentally, apart from the process in this embodiment, the control unit 101 activates the data decoding unit 105 with the control signal CTRL_DEC to generate the decoded data for the received data of the frequency having the highest reception strength.

Further, the control unit 101, upon reception of the next wakeup signal from the wakeup unit 102, outputs the control signals CTRL_RX and CTRL_CS to the receiving unit 108 and the carrier sense unit 106 and instructs the receiving unit 108 and the carrier sense unit 106 to carry out the carrier sense for the carrier sense frequency channels specified in Operation S47 (Operation S48).

In response to this instruction, the receiving unit 108, etc. carries out the carrier sense.

After that, the carrier sense unit 106, based on the data indicating the carrier reception strength from the receiving unit 108, judges the presence or absence of the carrier of the received RF signal for each frequency, and outputs the judgment result to the control unit 101.

Then, the control unit 101 judges, based on the judgment result from the carrier sense unit 106, whether all the carriers have yet to be detected for a given time (Operation S49).

Upon judgment that all the carriers are yet to be detected for a given time, the process proceeds to Operation S45.

Upon judgment that the carrier is detected for any of the frequencies based on the judgment result from the carrier sense unit 106, on the other hand, the control unit 101 judges whether the frequency of the maximum reception strength has changed or not, based on the reception strength data contained in the judgment result from the carrier sense unit 106 and the previous data on the frequency of the maximum reception strength stored in the memory 103 (Operation S51).

In the case where the frequency of the maximum reception strength has changed, it indicates that the frequency for the carrier sense to be carried out has changed, and therefore, the process returns to Operation S47.

Upon judgment that the process is not ended for some reason with the frequency of the maximum reception strength not changed, on the other hand, the process returns to Operation S49 (NO in Operation S53).

Upon judgment that the process is to be ended for some reason, on the other hand, the process is ended (YES in Operation S53).

In this way, by introducing the active tag apparatus 100 for executing the aforementioned process, a similar effect to the first embodiment can be achieved without changing the reader-writers 200.

Figure 13:
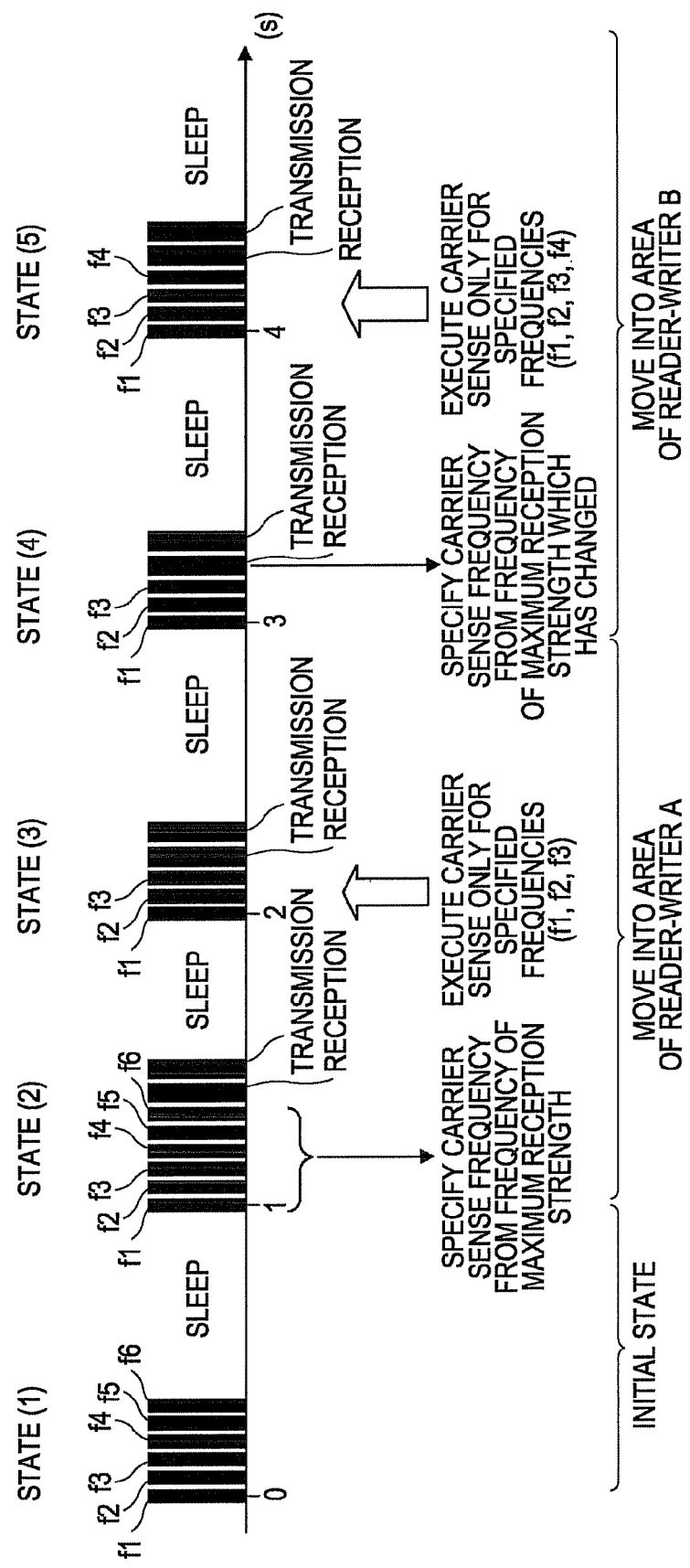
FIG. 13 is a diagram illustrating the process sequence according to the third embodiment.

Specifically, as a result, the active tag apparatus 100 can carry out the process sequence as illustrated in FIG. 13.

FIG. 13, in which the time elapses from left to right, illustrates an example of carrying out the carrier sense at intervals of one second.

Also, an example is illustrated in which the active tag apparatus 100 moves from the area of the reader writer A to the area of the reader-writer B in the reader-writer layout illustrated in FIG. 3.

First, in the initial state (state (1)), the carrier sense is carried out for all the frequency channels, and unless the radio wave is received from any reader-writer, the sleep mode is entered.

Once the active tag apparatus 100 moves to the area of the reader-writer A (state (2)), the first is to carry out the carrier sense for all the frequency channels in the same manner as in the initial state, and the carrier is detected at the frequency f1 thereby to specify that the frequency of the maximum reception strength is f1.

Then, the carrier sense frequency table stored in the memory 103 is searched with the frequency f1 of the maximum reception strength and the carrier sense frequencies f1 to f3 are specified.

Incidentally, also in this state, the data are transmitted to and received from the reader-writer A.

The next carrier sense (state (3)), if any, is carried out for the frequency channels in accordance with the carrier sense frequencies f1 to f3.

In the absence of a special event, the radio wave from the reader-writer A is received, and the reception and transmission process are executed for the reader-writer A.

After that, state (3) is sustained unless the active tag apparatus 100 leaves the area of the reader-writer A or the radio wave of the maximum reception strength undergoes a change in the particular area.

Assume that the active tag apparatus 100 soon moves to the area of the reader-writer B. In the initial state (state (4)), the carrier sense is carried out at the previous designated frequencies f1 to f3, but the frequency of the radio wave highest in reception strength changes from f1 to f2.

Then, the carrier sense frequency table is searched at the frequency f2 to specify the carrier sense frequencies f1 to f4.

Incidentally, also in this state, the data are transmitted to and received from the reader-writer B.

The next carrier sense (state (5)), if any, is carried out for the frequency channels in accordance with the carrier sense frequencies f1 to f4.

In the absence of a special event, the radio wave from the reader-writer B is received, and the reception and transmission process for the reader-writer B are executed.

After that, state (5) is sustained unless the active tag apparatus 100 leaves the area of the reader-writer B or the radio wave of the maximum reception strength undergoes a change in the particular area.

This process sequence is similar to the one illustrated in FIG. 9.

The embodiments of the present invention are explained above, but the invention is not limited to these embodiments.

The function block diagrams of FIGS. 5 and 6, for example, are not necessarily coincident with the actual module configuration.

The wakeup unit 102, for example, may be integrated with the control unit 101, and the control unit 101 may be implemented as a combination of a processor and a program. The control unit 201 may be implemented as a combination of a processor and a program.

The processor may have a built-in memory for storing a program, for example, or a storage unit such as a flash memory for storing a program may be arranged outside the processor.

Further, with regard to the process flow, the processes may be executed in a different order or a plurality of processes may be executed in parallel as long as a similar process result is obtained.

Incidentally, the host device and the reader-writer 200 may be implemented with an ordinary computer system.

Figure 14:
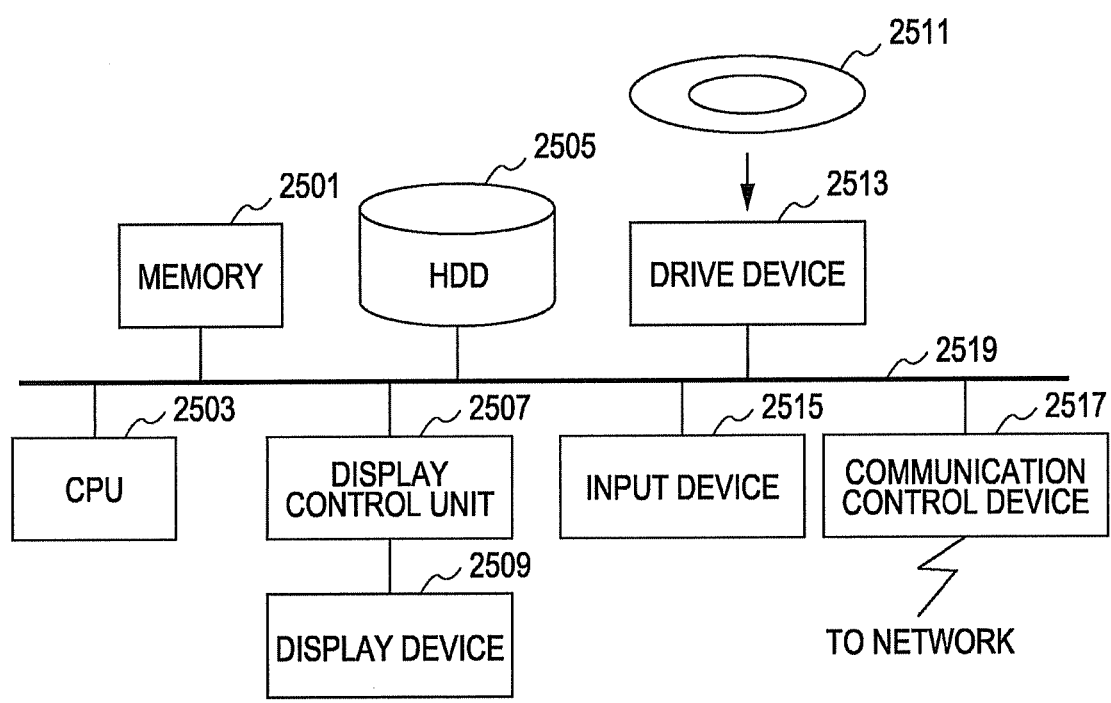
FIG. 14 is a function block diagram of a computer.

FIG. 14 is a function block diagram of the computer system.

The computer system illustrated in FIG. 14 includes, interconnected through a bus 2519, a memory 2501, a CPU 2503, a hard disk drive (HDD) 2505, a display control unit 2507 connected to a display unit 2509, a drive unit 2513 for a removable disk 2511, an input unit 2515 and a communication control unit 2517 for connection to a network.

The operating system (OS) and the application program for executing the process according to this embodiment are stored in the HDD 2505, and read out from the HDD 2505 to the memory 2501 at the time of execution by the CPU 2503.

The CPU 2503 controls the display control unit 2507, the communication control unit 2517 and the drive unit 2513 as required to perform the required operation.

Also, the data being processed are stored in the memory 2501, and if required, stored in the HDD 2505.

According to an embodiment of this invention, the application program for executing the aforementioned process is stored in a computer-readable removable disk 2511 for distribution, and installed from the drive unit 2513 to the HDD 2505.

The application program may alternatively be installed in the HDD 2505 through a network such as the internet and the communication control unit 2517.

In this computer system, the various functions described above are realized by organic collaboration between the aforementioned hardware such as the CPU 2503 and the memory 2501 and the OS and the required application program.

The embodiments described above are summarized below.

The data read-write apparatus according to the first aspect of the invention comprises a radio communication unit for conducting radio communication with an active tag apparatus capable of data transmission and reception by radio, a data storage unit for storing the frequency designation data including the local transmission frequency used for data transmission by the radio communication unit and constituting the data on the frequency for the carrier sense to be carried out by the active tag apparatus, and a control unit for causing the radio communication unit to transmit the frequency designation data stored in the data storage unit to the active tag apparatus at the local transmission frequency.

In this configuration, the active tag apparatus is not required to carry out the carrier sense at random, and the number of the frequencies for the carrier sense to be carried out is reduced, thereby making it possible to reduce the power consumption of the active tag apparatus correspondingly.

As a result, the time before changing the battery of the active tag apparatus can be lengthened.

Also, the control unit of the read-write apparatus described above may cause the radio communication unit to carry out the carrier sense at a plurality of given frequencies, so that the data on the frequencies of the carrier detected may be stored in the data storage unit.

By doing so, each data read-write apparatus is not required to be set manually.

The active tag apparatus according to the second aspect of the invention comprises a radio communication unit capable of carrying out the carrier sense at a plurality of frequencies and adapted to transmit and receive the data at a specified radio frequency to and from a data read-write apparatus, and a control unit which, upon detection that the data received from the data read-write apparatus by the radio communication unit contains the frequency designation data as a data on the frequency for the carrier sense to be carried out, designates to the radio communication unit the frequency for the carrier sense to be carried out, based on the frequency designation data.

By carrying out the carrier sense in accordance with the frequency designation data as described above, the power consumption is reduced more than in the case where the carrier sense is carried out at random.

The active tag apparatus according to the third aspect of the invention comprises a radio communication unit capable of carrying out the carrier sense at a plurality of frequencies and measuring the reception strength of the received radio wave to transmit and receive the data at a specified radio frequency to and from a data read-write apparatus, a data storage unit for storing, in correspondence with each other, the maximum reception strength frequency and the designated frequency as the frequency for the carrier sense to be carried out, and a control unit for causing the radio communication unit to carry out the carrier sense at a plurality of frequencies, receiving the result of measuring the reception strength of each of the plurality of the frequencies, specifying the frequency of maximum reception strength from the measurement result, reading the designated frequency corresponding to the particular frequency from the data storage unit and causing the radio communication unit to carry out the carrier sense at the particular designated frequency.

In this configuration, the number of frequencies for the carrier sense to be carried out can be reduced simply by the active tag apparatus.

In other words, the data read-write apparatus is not required to be corrected.

Incidentally, a program can be generated to carry out the aforementioned process in hardware. Such a program is stored in, for example, a computer-readable storage medium or storage unit such as a flexible disk, a CD-ROM, a magnetooptic disk, a semiconductor memory or a hard disk. Incidentally, the data being processed is provisionally stored in a storage unit such as a computer memory.

According to an aspect of the embodiments of the invention, any combinations of one or more of the described features, functions, operations, and/or benefits can be provided. In addition, a computer processor can include one or more computer processors in one or more apparatuses or any combinations of one or more computer processors and/or apparatuses as the case may be. An aspect of an embodiment relates to causing one or more apparatuses and/or computer processors to execute the described operations.

All examples and conditional language recited herein are intended for pedagogical objects to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A communication apparatus capable of radio communication with an active tag apparatus capable of data transmission and reception by radio, comprising:
    a storage that stores frequency designation data including a local transmission frequency and specifying data on a frequency carrier sense to be carried out by the active tag apparatus; and
    a processor that
        conducts radio communication with the active tag apparatus by using the local transmission frequency for data transmission, and
        transmits the frequency designation data to the active tag apparatus at the local transmission frequency, and
    wherein the frequency designation data is used to identify a frequency having a strongest signal strength for transmission with the active tag apparatus including based on comparison of data stored for a plurality of frequencies.

2. The communication apparatus according to claim 1, wherein the processor causes the radio communication unit to carry out the carrier sense at a plurality of given frequencies, and stores the detected carrier frequency data in the storage.

3. The communication apparatus according to claim 1, wherein the processor:
    measures a reception strength of data received for each of the plurality of frequencies, and
    determines the local frequency by comparing the data received for each of the plurality of frequencies, and
    wherein the frequency having the strongest signal strength from among the plurality of frequencies is selected for transmission with the active tag apparatus.

4. An active tag apparatus capable of radio communication with a communication apparatus, comprising:
    a memory; and
    a processor which executes procedures in the memory, the procedures including
        carrying out carrier sense at a plurality of frequencies and adapted to transmit and receive data at a specified radio frequency to and from the communication apparatus, and
        designating upon detection that the data received from the communication apparatus contains a frequency designation data specifying a frequency for the carrier sense to be carried out, the frequency for the carrier sense to be carried out based on the received frequency designation data, and
    wherein the frequency designation data is used to identify a frequency having a strongest signal strength for transmission with the active tag apparatus including based on comparison of data stored for a plurality of frequencies.

5. The active tag apparatus according to claim 4, wherein the procedures comprising:
    measuring a reception strength of data received for each of the plurality of frequencies, and
    determining the local frequency by comparing the data received for each of the plurality of frequencies, and
    wherein the frequency having the strongest signal strength from among the plurality of frequencies is selected for transmission with the active tag apparatus.

6. A system comprising an active tag apparatus capable of data transmission and reception by radio and a communication apparatus for conducting radio communication with the active tag apparatus;
    wherein the communication apparatus includes:
        a storage that stores frequency designation data including a local transmission frequency and specifying data on a frequency carrier sense to be carried out by the active tag apparatus; and
        a processor that
            conducts radio communication with the active tag apparatus by using the local transmission frequency for data transmission, transmits the frequency designation data to the active tag apparatus at the local transmission frequency, and wherein the active tag apparatus includes:

a memory; and a processor which executes procedures in the memory, the procedures including carrying out the carrier sense at a plurality of frequencies and conducting data transmission and reception at a specified frequency by radio with the communication apparatus, and designating, upon detection that the data received from the communication apparatus contains a frequency designation data specifying data on a frequency for the carrier sense to be carried out, the frequency for the carrier sense to be carried out based on the received frequency designation data, and wherein the frequency designation data is used to identify a frequency having a strongest signal strength for transmission with the active tag apparatus including based on comparison of data stored for a plurality of frequencies.

7. The system according to claim 6, wherein the processor of the active tag apparatus executes procedures including:

measuring a reception strength of data received for each of the plurality of frequencies, and determining the local frequency by comparing the data received for each of the plurality of frequencies, and wherein the frequency having the strongest signal strength from among the plurality of frequencies is selected for transmission with the active tag apparatus.

8. An active tag apparatus capable of radio communication with a communication apparatus, comprising:

a radio communication unit capable of carrying out carrier sense at a plurality of frequencies and measuring a reception strength of a received radio wave to transmit and receive data at a specified radio frequency to and from the communication apparatus;

a data storage unit that stores, in correspondence with each other, a maximum reception strength frequency and a designated frequency specifying a frequency for the carrier sense to be carried out; and a control unit that causes the radio communication unit to carry out the carrier sense at the plurality of frequencies, receives a result of measuring the reception strength for each of the plurality of frequencies, specifies a particular frequency from among the plurality of frequencies as the maximum reception strength frequency from the measurement result, reads the designated frequency corresponding to the particular frequency from the data storage unit and causes the radio communication unit to carry out the carrier sense at the designated frequency.

9. A computer program product stored on a tangible computer-readable medium for a communication apparatus capable of conducting radio communication with an active tag apparatus capable of data transmission and reception by radio, the computer program product comprising computer executable instructions that causes a computer of the communication apparatus to execute:

reading frequency designation data from a data storage unit storing a frequency designation data including a local transmission frequency used for data transmission by radio communication and specifying data on a frequency for carrier sense to be carried out by the active tag apparatus; and causing transmission by radio communication of the read frequency designation data at the local transmission frequency to the active tag apparatus, and wherein the frequency designation data is used to identify a frequency having a strongest signal strength for transmission with the active tag apparatus including based on comparison of data stored for a plurality of frequencies.

10. The computer program product according to claim 9, wherein the computer executable instructions comprising:

measuring a reception strength of data received for each of the plurality of frequencies, and determining the local frequency by comparing the data received for each of the plurality of frequencies, and wherein the frequency having the strongest signal strength from among the plurality of frequencies is selected for transmission with the active tag apparatus.

11. A computer program product stored on a tangible computer-readable medium for an active tag apparatus having a radio communication unit adapted to carry out carrier sense at a plurality of frequencies and transmit and receive data to and from a communication apparatus at a specified radio frequency, the computer program product comprising computer executable instructions that causes a computer functioning as the active tag apparatus to execute:

judging whether the data received by the radio communication unit from the data read-write apparatus contains frequency designation data specifying data on a frequency for the carrier sense to be carried out; and upon judgment that the frequency designation data is so contained, designating to the radio communication unit a frequency for the carrier sense to be carried out, based on the received frequency designation data, and wherein the frequency designation data is used to identify a frequency having a strongest signal strength for transmission with the active tag apparatus including based on comparison of data stored for a plurality of frequencies.

12. The computer program product according to claim 11, wherein the computer executable instructions comprising:

measuring a reception strength of data received for each of the plurality of frequencies, and determining the local frequency by comparing the data received for each of the plurality of frequencies, and wherein the frequency having the strongest signal strength from among the plurality of frequencies is selected for transmission with the active tag apparatus.

13. A computer program product stored on a tangible-readable medium for an active tag apparatus including a radio communication unit adapted to carry out carrier sense at a plurality of frequencies while at a same time measuring a reception strength of received radio wave to transmit and receive data to and from a communication apparatus at a specified radio frequency, and a reception strength measurement unit for measuring the reception strength of the received radio wave from output of the radio communication unit, the computer program product comprising computer executable instructions that cause a computer functioning as the active tag apparatus to execute:

causing the radio communication unit to carry out the carrier sense at the plurality of frequencies;

receiving a measurement result of the reception strength for each of the plurality of frequencies;

specifying a particular frequency from among the plurality of frequencies as a maximum reception strength frequency from the measurement result;

reading the designated frequency corresponding to the particular frequency from a data storage unit storing, in correspondence with each other, the maximum reception strength frequency and the designated frequency specifying a frequency for the carrier sense to be carried out; and causing the radio communication unit to carry out the carrier sense at the designated frequency.

14. A system, comprising:
a plurality of communication apparatuses for conducting radio communication at a plurality of frequencies; and
an active tag apparatus capable of data transmission and reception by radio with the communication apparatus only by executing carrier sense at selected frequencies from among the plurality of frequencies of communication apparatuses within a transceiving range of the active tag apparatus, and
wherein a frequency having a strongest signal strength from among the plurality of frequencies of communication apparatuses is identified for transmission with the active tag apparatus.

15. The system according to claim 14, wherein one or more of the communication apparatuses each comprise:
a data storage unit that stores frequency designation data including a local transmission frequency used for data transmission by the radio communication and data on a frequency of a carrier sense to be carried out by the active tag apparatus; and
a controller that transmits the frequency designation data stored in the data storage unit to the active tag apparatus at the local transmission frequency for causing the active tag apparatus to select a frequency for executing a carrier sense according to the frequency designation data when the communication apparatus enters the active tag apparatus transceiving range.

16. The system according to claim 15, wherein the controller executes carrier sense at the plurality of frequencies according to frequencies use by other communication apparatuses, and stores the detected carrier frequency data in the data storage unit.

17. The system according to claim 14, wherein the active tag apparatus comprises:
a data storage unit that stores, in correspondence with each other, a maximum reception strength frequency and a selected frequency specifying a frequency for the carrier sense to be executed; and
a controller
executing carrier sense at a plurality of frequencies;
measuring a reception strength of a received radio wave to transmit and receive data at a specified radio frequency to and from the communication apparatuses;
receiving a result of measuring the reception strength for each of the plurality of frequencies,
determining a particular frequency from among the plurality of frequencies as the maximum reception strength frequency according to the measurement result,
selecting a frequency corresponding to the particular frequency as the maximum reception strength frequency from the data storage unit, and
executing the carrier sense at the selected frequency.

18. The system according to claim 14, wherein the active tag apparatus comprises:
a memory that stores, in correspondence with each other, a maximum reception strength frequency and a selected frequency specifying a frequency for the carrier sense to be executed; and a processor which executes procedures in the memory, the procedures including
executing carrier sense at a plurality of frequencies,
measuring a reception strength of a received radio wave to transmit and receive data at a specified radio frequency to and from the communication apparatuses,
receiving a result of measuring the reception strength for each of the plurality of frequencies,
determining a particular frequency from among the plurality of frequencies as the maximum reception strength frequency according to the measurement result,
selecting a frequency corresponding to the particular frequency as the maximum reception strength frequency from the data storage unit, and
executing the carrier sense at the selected frequency.

19. The system according to claim 14, wherein one or more of the communication apparatuses each comprise:
a memory that stores frequency designation data including a local transmission frequency used for data transmission by the radio communication and data on a frequency of a carrier sense to be carried out by the active tag apparatus; and
a processor which executes procedures in the memory, the procedures including
transmitting the frequency designation data stored in the memory to the active tag apparatus at the local transmission frequency causing the active tag apparatus to select a frequency to execute a carrier sense according to the frequency designation data when the communication apparatus enters the transceiving range of the active tag apparatus.

20. The system according to claim 19, wherein the procedures includes
executing a carrier sense at the plurality of frequencies according to frequencies use by other communication apparatuses, and
storing the detected carrier frequency data in the memory.

21. An active tag apparatus capable of radio communication with a communication apparatus, comprising:
a memory that stores, in correspondence with each other, a maximum reception strength frequency and a designated frequency specifying a frequency for the carrier sense to be carried out; and
a processor which executes procedures in the memory, the procedures including
carrying out a carrier sense at a plurality of frequencies,
measuring a reception strength of a received radio wave to transmit and receive data at a specified radio frequency to and from the communication apparatus,
receiving a result of measuring the reception strength for each of the plurality of frequencies,
specifying a particular frequency from among the plurality of frequencies as the maximum reception strength frequency from the measurement result,
reading the designated frequency corresponding to the particular frequency from the data storage unit, and
causing the radio communication unit to carry out the carrier sense at the designated frequency.

* * * * *